United States Patent
Bosznay et al.

(10) Patent No.: US 11,379,597 B2
(45) Date of Patent: Jul. 5, 2022

(54) METHOD AND SYSTEM FOR DETERMINATION OF AUTHENTICITY OF AN ELECTRONIC DOCUMENT OR COPY THEREOF BY COMPARING IT WITH AN EARLIER AUTHENTIC VERSION OF THE ELECTRONIC DOCUMENT IN QUESTION

(71) Applicant: INTERSOFT HUNGARY KFT., Budapest (HU)

(72) Inventors: Ádám Bosznay, Budapest (HU); Péter Eckhardt, Budapest (HU); Mihály István Lantos, Budapest (HU); Csaba Sár, Budapest (HU); Péter Sütheö, Budapest (HU)

(*) Notice: Subject to any disclaimer, the term of this patent is extended or adjusted under 35 U.S.C. 154(b) by 650 days.

(21) Appl. No.: 16/321,452

(22) PCT Filed: Jul. 24, 2017

(86) PCT No.: PCT/HU2017/050029
§ 371 (c)(1),
(2) Date: Jan. 28, 2019

(87) PCT Pub. No.: WO2018/020284
PCT Pub. Date: Feb. 1, 2018

(65) Prior Publication Data
US 2021/0303710 A1    Sep. 30, 2021

(30) Foreign Application Priority Data
Jul. 26, 2016 (HU) .................. P1600467

(51) Int. Cl.
*G06F 21/62* (2013.01)
*G06F 16/93* (2019.01)
(Continued)

(52) U.S. Cl.
CPC .......... *G06F 21/6209* (2013.01); *G06F 16/93* (2019.01); *G06F 21/602* (2013.01); *G06K 9/00483* (2013.01)

(58) Field of Classification Search
CPC .... G06F 21/6209; G06F 21/602; G06F 16/93; G06K 9/00483
See application file for complete search history.

(56) References Cited

U.S. PATENT DOCUMENTS 6,138,254 A * 10/2000 Voshell ................. G06F 12/02
710/68
2004/0220975 A1 * 11/2004 Carpentier ........... G06F 16/137
(Continued)

*Primary Examiner* — Vance M Little
(74) *Attorney, Agent, or Firm* — Handal & Morofsky LLC; Anthony H. Handal

(57) ABSTRACT

Method and system for determination of authenticity of an electronic document by comparing the document in question with itself at a later date or with a copy thereof, which method comprises two phases wherein the first phase is the entry of the original document and the second phase is the verification of the identity between the document to be authenticated and the original one. The method requires a double levelled system comprising of a satellite system accessible by the user and a central core system. Only values which are derived from the document in a predetermined way are stored in the core system and the core system generates an individual first code which is associated with the document. During verification a transformed control value is generated in the same way as previously from the document and the associated code, then based on the first code following a transformation access is provided to the transformed control value stored in the core system. If the two control values are identical the identity of the two documents is authentic.

12 Claims, 3 Drawing Sheets

(51) Int. Cl.
  *G06F 21/60* (2013.01)
  *G06K 9/00* (2022.01)

(56) References Cited

U.S. PATENT DOCUMENTS

2008/0091671 A1* 4/2008 Dewulf ............... G06F 16/3329
2012/0144406 A1* 6/2012 Colombo ................ G06F 9/541
                                                    719/328
2019/0005268 A1* 1/2019 Gupta ............. G06K 19/06037

* cited by examiner

METHOD AND SYSTEM FOR DETERMINATION OF AUTHENTICITY OF AN ELECTRONIC DOCUMENT OR COPY THEREOF BY COMPARING IT WITH AN EARLIER AUTHENTIC VERSION OF THE ELECTRONIC DOCUMENT IN QUESTION

FIELD OF THE INVENTION

The invention relates to a method and system for determination of authenticity of an electronic document or copy thereof by comparing it with an earlier authentic version of the electronic document in question. The determination of authenticity shall occur upon request.

BACKGROUND

In medieval Hungary a "loca credibilia" (authentic place) used to be a generally ecclesiastic—institution in which documents of private individuals or communities containing privileges, rights, wills, etc., were not only put into writing but such writs were also stored and guarded. In addition, the authentic place also sealed such documents, thereby verifying the authenticity thereof.

Today guarded storage safes are generally installed either in homes or in banks and authentication is primarily performed by notary publics. In the digital world this question does not yet have a reliable solution. The number of documents is too high, while multiplication and copying is easier than ever, which makes authenticity highly doubtful.

With the wider use of different cloud services and social networks more and more documents are stored and shared in digital form. Authenticity of such contents is practically unverifiable. Authentication methods supported by information technology solutions do certainly exist, but these generally use digital signatures which are expensive, their handling is complicated, and their authenticity remains difficult to verify.

There are a number of occasions when there is a need for certain personal documents, instances such as showing ID certificates for transactions at banks, or obtaining a copy of a diploma when applying for a position, for example. Over time, multiple digital and hard copy versions of the documents come into existence. It becomes difficult to follow when the documents came into being, by whom and for what purpose they are used, possibly even against our interest.

The criteria which define authenticity of documents, the applicable procedures, and the parameters of authentication are defined by laws on electronic signatures. These parameters are the following:

the source of authenticity, i.e., who or which organization authenticated the document;

when the authentication occurred;

proof that the content has remained unchanged since the authentication.

During the process of popular authentication methods the authentication labels are attached to the content and forwarded inseparably therefrom. The attachment typically happens through an asymmetric key infrastructure, one of the keys is public. This method is commonly known as PKI (Public Key Infrastructure). The signature is created with the help of the private or secret part of PKI by encoding the identity certificate of the signatory and/or their organization, the control value of the content, the timestamp, and the certificate of the organization that issued the timestamp. The latter can also be provided as a separate signature. During the verification, appropriate software (e.g. a pdf reader) can use the public key to decode the content of the signature, it generates the control value of the content and compares it with the value fixed in the signature and hence establishes whether the content has changed since the signature was added. The identity of the signatory can be determined by checking the certificate. The source of control is the so-called revocation list which contains the certificates issued by the trustworthy authentication providers together with their time of validity. At the date of the control it should be checked whether (a) the certificate is listed in the revocation list and (b) the certificate was valid at the date of the signature. This requires the revocation list to be complete and updated. In everyday practice one of the problems which most users face is the accessible revocation list being incomplete since a significant number of authentication providers are not contained therein. But even with regard to those listed, it is not certain that the list is fully updated, e.g. due to an update that has not arrived to the computer of the user. Similar problems might arise when checking the timestamp. In case the certificate of the provider of the timestamp is not contained in the list of reliable certificates, the authenticity of the timestamp cannot be determined, that is to say that the authentication was truly made at the date and time as contained in the signature.

Apart from the certification of previously certified documents or copies thereof, several other tasks exist where a document cannot be authenticated by a registered authentication service provider owing to the nature of its content or the fact that the owner of the document does not want to share the document with an authenticating body (due to the confidential nature thereof).

For the authentication of documents (that is, for verifying the authenticity of a document or of a copy thereof) several authentication methods and systems are known. One of the most serious concerns of users of such methods and systems include mistrust in the flawlessness and constant accessibility of electronic systems, and reluctance to share the content of their documents with an unfamiliar authenticating body. In the description of the prior art of U.S. Pat. No. 8,037,310 the mistrust of users toward digital, electronic solutions is mentioned. They suggest a combined authentication system in which digital processing is combined with analogue methods, and the user determines the identity of the original and examined documents based on the visual information displayed to them.

U.S. Pat. No. 8,086,570 describes a document management system which organizes copies of an original document in the order of their creation and indicates the ordinal number of a particular copy. This kind of registration requires additional effort which is unnecessary in most cases since for example, a situation can arise where it is necessary to certify that a given original document is identical to its own previously authenticated version.

The publication US2002/0023220A1 describes a method in which an authentication code is associated with the document to be certified, and based on the code it is possible to establish whether or not the document is identical with the original one. The method uses a plurality of connected sub systems, one of which is available to the user, and the system also has several central servers which only contain information that is obtained from further encoding. The authentication happens in two steps. First, the document to be authenticated is encoded in a similar process as the original document was encoded, and then the representations that are obtained by a second encoding are compared with each other. The identity of the second document with the first one is certified if the representations obtained by the second encoding are identical. This publication does not discuss the issue of how to verify and prevent if a first code assigned to the document is contained in or used as the code of a different document stored in the system. This system also fails to tackle the issue of how to find based on the code provided to the user and associated with the document in an easy and secure way the address of the storage cell in which the representation of the document is stored within the system, a system that comprises a high number of users and the data of an even higher number of documents. The association of the storage cell address to the document should not only be unambiguous, but it should also be ensured that this address cannot be learned or derived from the data available at the user. The aforementioned publication does not deal with these questions and does not describe how these conditions that ensure the security of authentication should be provided.

US 2006/0220975 A1 relates to methods of adding a computer file to a database, then to further methods how the file can be retrieved so that it is ensured that the retrieved file is strictly the same as the one added previously. Here two values are made from the file, namely an address value and a verification hash value, and a table is made in which these data are stored. The verification hash value is formed by coding the address hash value. In an embodiment the file is stored at an address generated by a random generator and this numeric value is also stored in the table together with at least the verification hash value. When a file is retrieved its verification hash value is calculated and compared with the similar value stored in the table, and the retrieved file is accepted as genuine if these two verification hash values are the same. This publication is silent about the question how can the identity of a document with another document be established in a secure way. Furthermore, the database in this system stores the full files of the documents and causes thereby reliability problems.

The reason behind the mistrust in digital solutions is that even data that is guarded with the highest degree of caution and confidentiality cannot be eliminated from the risk of unauthorized access. All systems can suffer a hacker attack, and increasing the degree of security leads to the increase of storage and access costs of the stored data.

BRIEF DESCRIPTION

Therefore, there is a need for a document authentication and authentication verification system and method which is reasonably priced and which, owing to its architecture, makes unauthorized authentication impossible even when dealing with the most sophisticated hacker attacks.

The primary objective of the invention is to provide a method for determination of authenticity of an electronic document or copy thereof upon request by comparing it with an earlier authentic version of the electronic document in question, a method which is free from the drawbacks of existing solutions.

The second objective is the verification of the authenticity of a certificate of a document that had been issued with a certificate.

A further objective lies in providing an authentication system that makes it possible in a flexible way that a document be signed by different persons at different times and places, and that makes sure that the content of the document remains unchanged after all signatures have been added.

These objectives can be achieved by the method and system as defined in the attached claims.

Thanks to their design, the method and system according to the invention can also function as an electronic safe that can store the original document of the client.

In view of the fact that in the solution of the invention no data of the document to be authenticated is stored in the central core system, and in case of the preferred embodiments the first code associated with the document is not stored, which allows for such high a degree of safety that even in case of an unauthorized access to the core system neither the data of the document nor the first code associated with the document can be retrieved; knowledge of either could potentially lead to the control database that stores the relevant derived data. At the same time, the data stored in the core system in connection with the document can easily be found but the storage address cannot be learned or derived within a finite timeframe based on the data available to the user.

It is precisely the increased reliability and its double levelled system design that justify that we name the system Loca Credibilia which corresponds to the Latin expression authentic place (that was already used in medieval times) in order to distinguish the system thereby from other authentication systems belonging to the prior art that cannot offer the same level of reliability and such a broad range of services.

The method and system according to the invention will now be described in connection with exemplary embodiments thereof, in which reference will be made to the accompanying drawings.

DETAILED DESCRIPTION

The Loca Credibilia system and method is capable of performing a very broad range of authentication an safe storage functions, however, in order to understand the basic structure of the system and the minimal conditions of the method for using the system will be described in order to provide clarity and comprehensibility.

Let us suppose the existence of a document D authenticated earlier by an authentication body which is available in electronic from (see FIG. 1) and whose content C is known and so is the data required for the authentication. These data include a check value CH generated from the content C, a timestamp TS that defines the exact time of the authentication, an authentication certificate AC that serves for the unambiguous identification of the person or body who has carried out the authentication, and possibly other data OD certifying the authentication. The authentication data are contained in an authentication field AF which is definitely and undeniably associated with the document D. The association can be made in a way that the authentication field AF constitutes an
inseparable part of the document D, but it is also possible that the authentication field AF is associated to the document D at a separate location however with the logical inseparability provided.

The task lies basically in how to determine without doubt whether document D' is identical with document D, in case someone at a later date and/or place has a document D', its content C', and the associated authentication field AF'. If document D' is identical with document D in all of the aforementioned aspects, document D' can be awarded an authentication certificate. A further part of the task which has not been mentioned earlier for the sake of clarity is to verify whether the content of the authentication field AF associated with the document D is truly authentic thus whether it has probative value.

Figure 2:
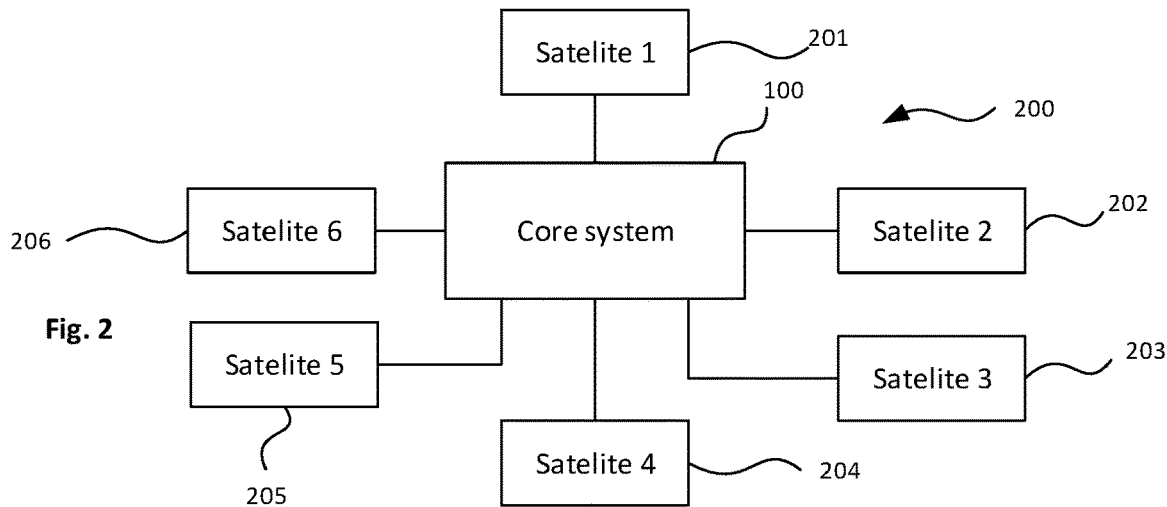
FIG. 2 is the most general, simplified block diagram of the system according to the invention.

The most general system sketch of the authentication system according to the invention is shown in FIG. 2. The whole system practically comprises a single central core system 100 and satellite system 200 connected to the latter, of which FIG. 2 shows the satellite stations 201 . . . 206. There is a highly efficient distribution of structural and logical tasks between the core system 100 and the stations of the satellite system 200, and the composition and unique functioning of these ensures the outstandingly safe properties of the solution according to the invention.

Figure 3:
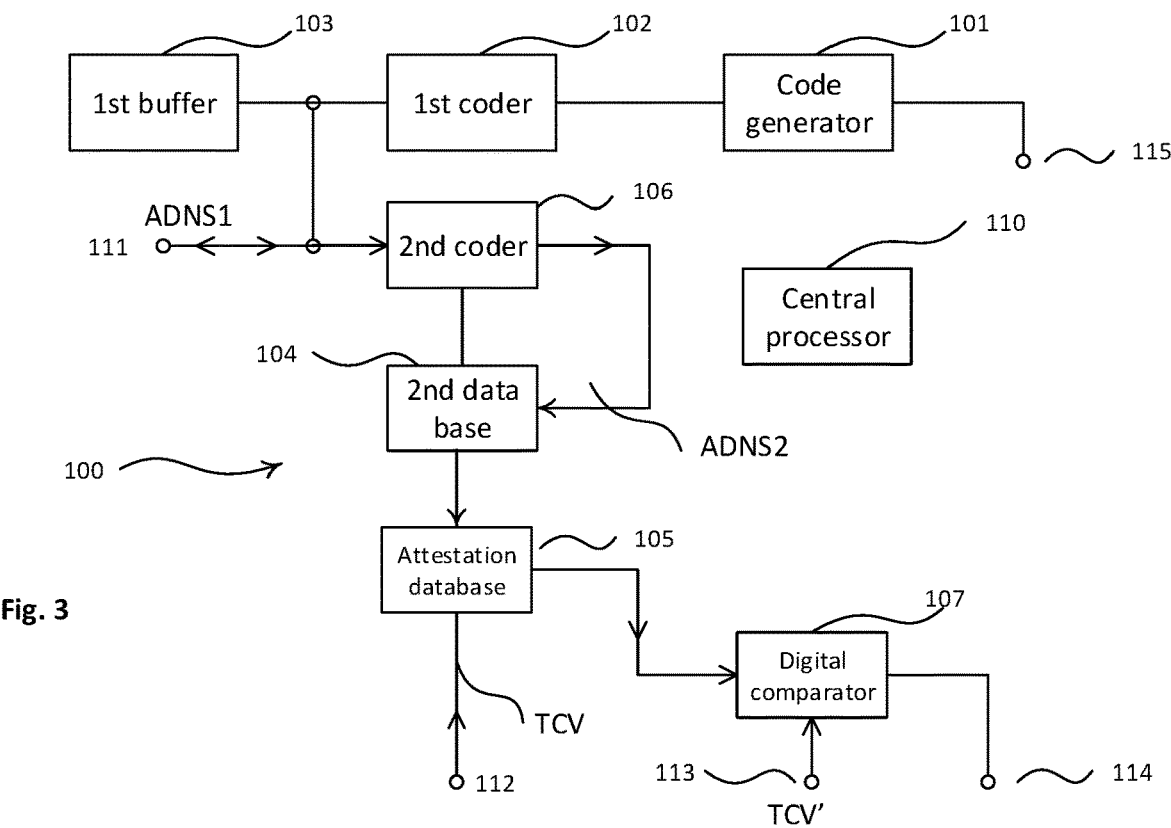
FIG. 3 shows the functional block diagram of the simplest structure of the core system 100.

The simplified functional block diagram of the core system 100 is shown in FIG. 3. Generator 101 can generate a high number of numeric sequences differing from each other and their number can be at least 1040 but ideally it can reach even 1051, and the length of the sequences can be between 20 and 40 bytes. If a numeric sequence shorter than 20 bytes is chosen, then the number of possible variations will still be high enough to ensure safe operation, therefore, no accurate lower length limit can be given. However, the sufficiently safe range is above 20 bytes. It is true that the numeric sequences generated by the generator 101 are all unique, and even based on the knowledge of the previously generated sequences and/or even based on their analysis, the forthcoming sequences cannot be determined. Supposing finite computing capacity and limited time a non-authorized person will not be able to generate any false code sequence. Generator 101 belongs to the type of random number generators that satisfy the aforementioned condi¬tions. The generator 101 generates a numeric sequence only upon a request received through gate 115 of one of the satellite stations, and it is also possible to request a bundle containing a specified number of sequences in which case the numeric sequences in the bundle will be generated consecutively, one after the other. For the sake of increased security all of the gene¬rated numeric sequences will be transformed by a first coder 102 through a non-invertible algo¬rithm (e.g. by the use of a hash function) into a byte sequence that has the same length and falls within the aforementioned range of 20 to 40 bytes. The codes generated in the system according to the invention are referred to as ADNS codes, and two kinds of them will be used, called code ADNS1 and code ADNS2. The encoded numeric sequence generated in response to the individual requests which appears at the output of the first coder 102 will be called code ADNS1 (first ADNS code), and this code will form one of the basic parts of the authentication.

Although the structure of the code generator 101 excludes the possibility of generating two identical sequences, and the first coder 102 also generates different output codes from the input numeric sequences, the security of the system requires that a code ADNS1 shall only be validly issued if it is certain that the same code has not been issued or used previously. The ADNS1 codes that are checked in this way will be sent through gate 111 to the same satellite station from which the request has been received.

The generated code ADNS1 is sent to the input of a first buffer 103 or to a transitional memory and will be stored there for a transitional period of time. From the code ADNS1 a second coder 106 generates the second code ADNS2. The generation also uses a non-invertible algorithm, ideally by applying a hash function. The second code ADNS2 is coupled directly to the address input of an attestation database 105. Therefore, the code ADNS2 constitutes the access address (key) of the attestation database 105, and therefore the content of the attestation database 105 can only accessed in the knowledge of the code ADNS2 as its address. In the cell of the attestation database 105 addressed by the code ADNS2 a transformed control value TCV is written which arrives from the satellite system 200 through a gate 112 of the data to be authenticated, where the transformed control value TCV is associated with the request and constitutes a transformed authentication code. The output of the second coder 106 is also connected to a database 104 into which the code ADNS2 is written and stored when the uniqueness of the code ADNS1 has been checked.

In case the authenticity (i.e. the identity with the original document D) of a document D' needs to be established then such a request is forwarded by one of the satellite stations 201 . . . 206 to the core system 100 and by providing the code ADNS1' (which code can be found on the document D') through the gate 111 and sending the transformed control value TCV' (generated in the satellite system 200 as described later) of the document D' through a further gate 113. The attestation database 105 will then be addressed by a second code ADNS2' that has to be checked and which is generated by the second coder 106 and derived from the code ADNS1' that has to be checked, and then the transformed control value TCV stored at this address will be read. A digital comparator 107 compares the transformed control value TCV read in this way from the attestation database 105 that is associated with the document D with the check value TCV' that has been forwarded to a second input of the digital comparator 107 by the satellite system through the gate 113, and if the two codes are identical, then the system announces through gate 114 the identity which qualifies the questioned document D' as authentic, and in case if the two values are different, the authentication will be denied.

Figure 4:
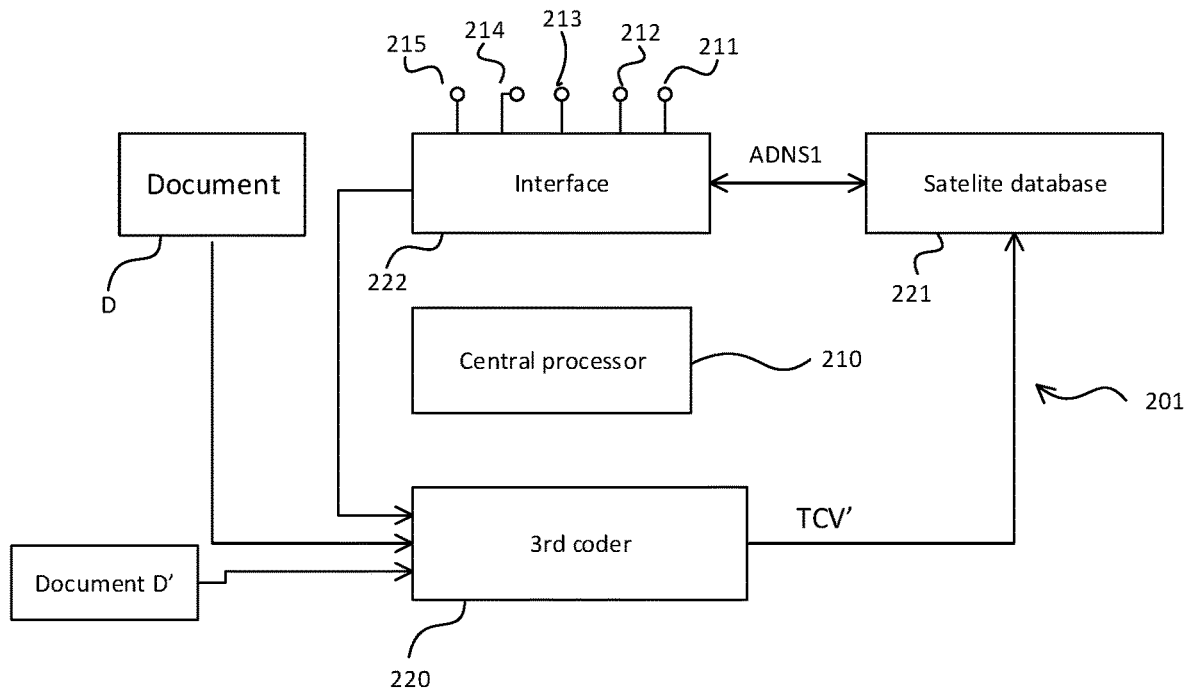
FIG. 4 is the functional block diagram of a satellite station.

FIG. 4 shows the simplified functional block diagram of a satellite station, e.g. the station 201. Although it is not directly a part of the satellite station 201, on a functional basis the process of receiving the document D can only be associated with this satellite station 201. Here, document D can be a document authenticated earlier by an authentication organization or it can be a docu¬ment that a subscriber of any sub-system wants to be stored in an unchanged state and wishes to provide the possibility that the system authenticates the identity of a copied document D' made allegedly of document D. Document D' can be the original document D itself at a later date or place, and the current owner thereof may wish to check whether the document is identical with the original document D which was entered the system previously. The satellite station 201 comprises a central processor 210 which ensures the coordinated operation of the above described processes. A third coder 220 generates transformed control values TCV and TCV' both from the original document D and the document D' (that was submitted for authentication), respectively (preferably by providing a hash function). This process will be described later in more detail. The generation happens in such a way that if and only if the content of document D is identical with that of document D' then the same transformed control value will be obtained. The satellite system comprises a satellite database 221 and an interface 222 which comprises gates 211, 212, 213, 214, and 215 that correspond to the gates 111, 112, 113, 114, and 115 of the core system 100. These gates are not in direct physical connection but symbolize the associated functional connections.

The authentication methods and the processes that take place in the system will be described with the help of flowcharts.

Figure 1:
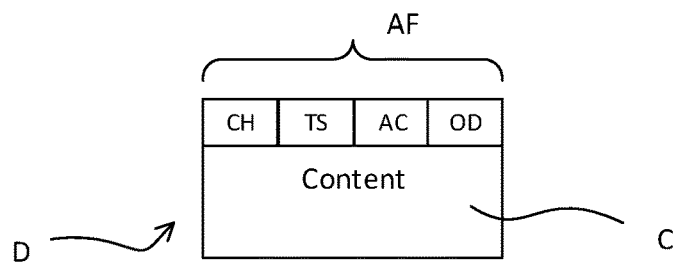
FIG. 1 shows the structure of a document D that constitutes the basis of authentication.

Let us suppose that a subscriber of the system reported his wish to store the document D in the Loca Credibilia system so that if at any time there will be the need to check the identity of a copy D' made of the document D, the system can certify its authenticity. The document D can be a document provided previously with a certificate of authenticity and in that case it has the structure as shown in FIG. 1, but it can also be a document presented in electronic form which is regarded by the subscriber as authentic and they only need the certification of a copy made of the original document at a later date. For the sake of simplicity let us choose this second, simpler case.

Figure 5:
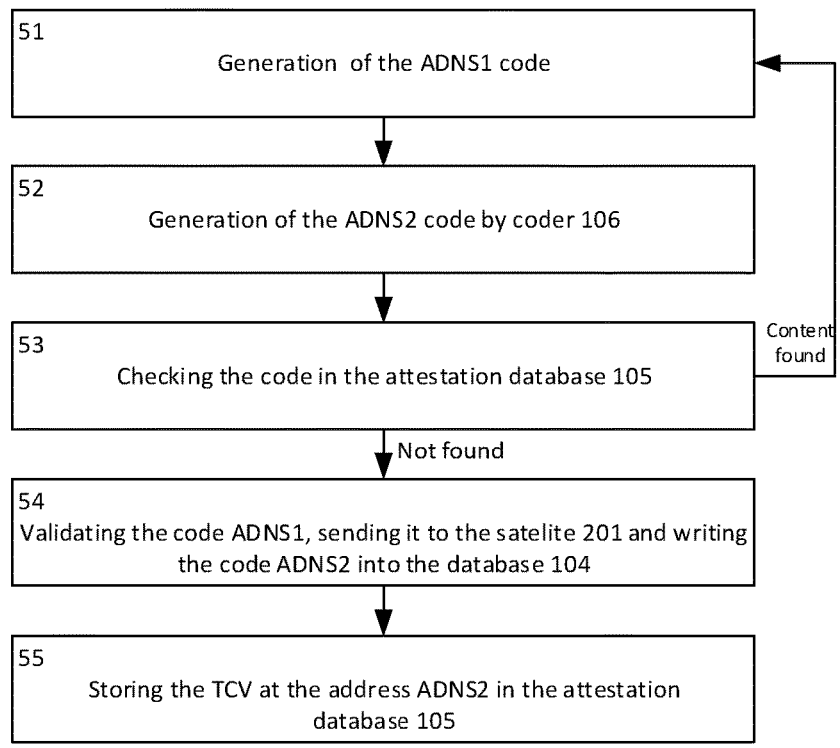
FIG. 5 is a flowchart showing the generation of the first and second codes.

When the document D has to be entered in the system, the subscriber reports this wish to a satellite station with which they have contracted earlier, and sends the document D to that satellite station 201. The first step of the process will be that the document D is assigned a unique ADSN1 code. This association process is shown in the flowchart of FIG. 5

When the request to enter the document D is made the central processor 210 sends a signal through gate 215 of interface 222 to the generator 101 through the gate 115 of the core system 100. If the client (subscriber) requests the entry of a single document or a plurality of documents in a bundle then there is the possibility to report the number of documents and then the corres¬ponding number of individual codes will be generated. In the simplest of cases the generator 101 generates a single individual bit sequence in response to the request. For excluding any rever¬sibility and to ensure the identical length of the codes, the output bit sequence of the generator 101 will be transformed by the first coder 102 using a hash function, and the so obtained code will be regarded as code ADNS1 and will be made an indispensable part of the document D. These steps together form the first step 51 of FIG. 5. Before sending the code ADNS1 to the satellite system 100 an examination is carried out, i.e., the first code ADNS1 received at the end of step 51 is encoded by the second coder 106 in next step 52 and the second code ADNS2 is generated from the code ADSN1 by the second coder 106. An optional possibility is storing the first code ADNS1 in buffer 103. In third step 53, the attestation database 105 is addressed by the code ADNS2 and it is established whether there is any stored content at this address. In case content is found, then the first code ADNS1 is invalidated and a new first code ADNS1 is generated. This process is repeated until there is no data in the attestation database 105 at the address corresponding to code ADNS2. Please note that this examination serves only for an increased reliability since the generation of an invalid first code ADNS1 has no measurable probability. If in the step 53 no data is found, then the first code ADNS1 is validated and it is sent to the satellite system 200. In step 54 the transformed control value TCV of the document D, created in satellite system 200 is written and stored in the attestation database 105 at the address corresponding to the code ADSN2. At the same time the now valid code ADNS2 is stored and written in the database 104. After this in step 55 at the address ADNS2 the transformed control value TCV is written in the attestation database 105 received from the satellite system 200.

In case the code ADNS1 has previously been written in the buffer 103 then in the step 54 it will be deleted from there once at the end of the step 53 the code ADNS1 is validated by having it sent to the satellite system 200. The buffer 103 is mainly needed when a higher number of codes ADNS1 is requested simultaneously and are written one by one into the buffer 103 and when any given one of the codes ADNS1 has been sent to the satellite system then this will be deleted from the buffer 103. After the last code from the group has been validated then the buffer 103 will be empty.

At first, this double coding appears to have no sense because using the code ADNS1 would enable the storage of valuable content in the core system 100 anyway. However, the double coding provides increased security and excludes even the slightest possibility of unauthorized access. The code ADNS1 (as described soon) will be attached to document D. For example, even if someone had access to the database of the core system 100 and knew the code ADNS1, the intruder could, however, not arrive with a finite number of operations to the transformed control value TCV stored in the attestation database 105 at the address ADNS2, it being a further coded sequence obtained from the code ADNS1. Not to mention that the transformed control value does not contain the content of document D. If someone had unauthorised access to the core system 100, he could not obtain any valuable information because the codes ADNS2 cannot be decoded in reverse direction and the code ADSN1 cannot be obtained from them. The code ADNS1 is always indicated on a given document therefore the values stored in the attestation database 105 could not be interpreted and used.

Figure 6:
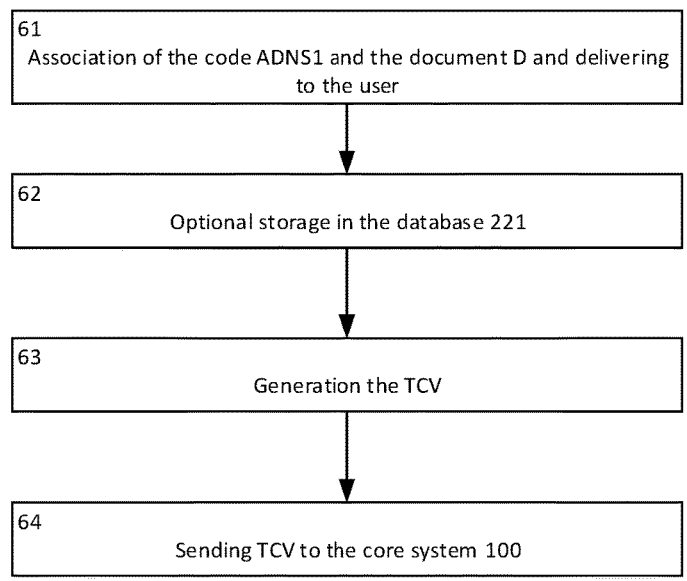
FIG. 6 is a flowchart showing the transformed control value.

The flowchart of FIG. 6 shows the generation of the transfer control value TCV made from the document D to facilitate the control thereof. The document D has at least content C and at least one attestation timestamp TS which are available in digital form. If the document D is entered now into the system then the timestamp TS will be the time when entry is requested (when the code ADNS1 is requested). In case the document D has been certified earlier then the document D comprises the authentication field AF as well.

In step 61 the code ADNS1 verified previously in the core system 100 as described in FIG. 5 is associated with the document D. In the Loca Credibilia system the authenticated document is always inseparably associated with the code ADNS1 which constitutes the basis of authentication. If the document is available in hard copy, i.e. on paper, the code ADNS1 is printed on the document in form of a QR code, and this makes the code ADNS1 machine readable.

Depending on the client's needs, step 62 provides an optional possibility of storing the document D and the code ADNS1 in the database 221 of the satellite station. This database also stores the data relating to the client. In case the system is used as an electronic safe, this step is required. The document D together with the associated code ADNS1 is provided to the client, as any later authentication can only be requested on that basis.

In step 63 the content of document D, the associated authentication field AF and the associated and recorded code ADNS1 are transformed by third coder 220 using a hash function, and this transformed value will constitute the previously mentioned transformed control value TCV. Its length is always constant independent from the content of document D and falls in the referred range of 20 to 40 bytes.

In step 64 the so generated transformed control value TCV is sent from the satellite system 200 to the core system 100 and will be written into the attestation database 105 of the core system 100 at the previously generated address of code ADNS2.

It is true that during this process, nothing is stored from the content C of the document D in the database of the core system 100, instead a transformed control value TCV is stored which can be definitely associated with the document D. In case the data of the core system 100 would accidentally get into the possession of unauthorized persons, they could in no way learn or derive the content of the document D and could not know the address where the transformed control value TCV associated with document D is stored, since this address is different from the code ADNS1 stored in the satellite system, which code might be known to the intruder.

Let us suppose that following the entry of the document D into the Loca Credibilia system at a later date or a different place (at any one of the satellite stations 201 . . . 206) someone presents a document D' and alleges that it is identical with the document D and requests its authentication. Following the entry into the Loca Credibilia system the document D also contains the associated code ADNS1.

Figure 7:
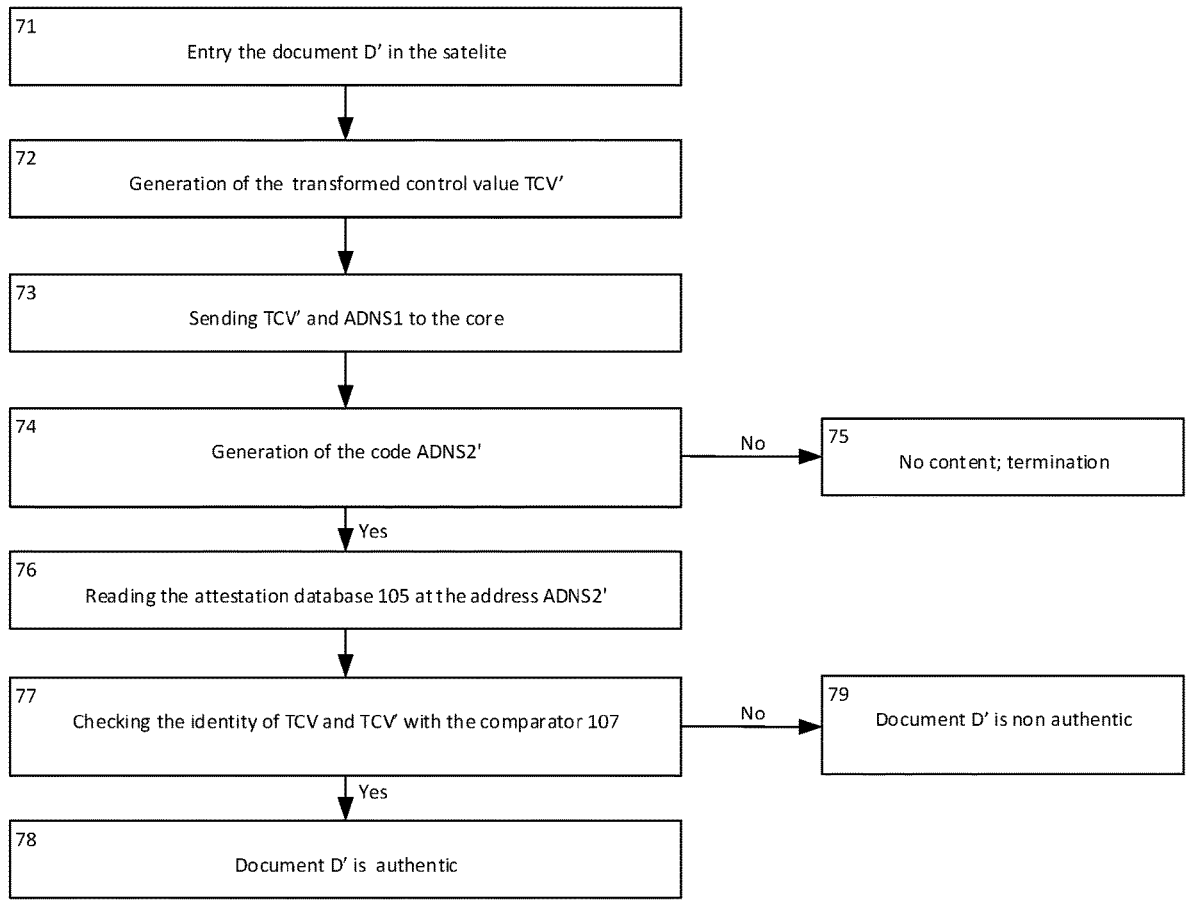
FIG. 7 is a flowchart showing the process of authentication.

The flowchart of FIG. 7 shows the process of verifying authenticity. In step 71 the document D' is entered into the given satellite station 201 . . . 206, and in step 72 the content, the attestation field and code ADNS1' of the document D' is coded by third coder 225, whereby a transformed control value TCV' is generated. It must be noted that in case the so obtained transformed control value TCV' is identical with the transformed control value TCV stored in core system 100, then the document D' is authentic. In step 73 both the code ADNS1' and the transformed control value TCV' are sent to the core system 100.

In step 74 a code ADNS2' is generated from the code ADNS1' by a further coding. If the document D' is authentic then the code ADNS2' will be the same as the code ADNS2. Before verifying the content, it is first examined whether at the address corresponding to the code ADNS2' there is any stored content in the database 104. If such content does not exist, the operation is terminated and in step 75 it is signalled to the satellite station that such code does not exist and hence the authentication of the document D' cannot be carried out.

If any content is found, then in step 76 the content stored at the address of the code ADNS2' in the attestation database 105 is read, and in step 77 it is examined by digital comparator 107 whether the transformed control value TCV stored in the attestation database 105 at the address ADNS2' is identical with the transformed control value TCV' received after step 72 from the satellite station 201 . . . 206. If identity is found, then in step 78 the satellite station is notified that the document D' is the authentic copy of the document D, and if no identity is found then in step 79 it is reported that the document D' is different from the document D and authentication cannot be determined.

The authentication described herein operates with a high degree of reliability and does require the storage of the document D neither in the satellite system 200 nor in the core system 100. Of course, if the satellite system 200 stores the document D then the verification of any potential differences can be carried out in an easier way.

In the foregoing description only the basic functions of the Loca Credibilia system have been described. This basic function can be complemented with a number of further functions. One of the most important additional functions is recording the document D in the system only following the verification of its authenticity. A precondition of such a verification function is that the core system 100 be in online connection with the major authentication bodies, due to the system's special tasks, and is familiar with the structure of the certificates made by such bodies and possesses their complete and updated revocation lists. In this case, preceding the processes shown in FIG. 5, i. e. the generation of the code ADNS land its association with the document D, the data of the attestation field AF from the satellite system 200 are entered and forwarded to the core system 100 where it is examined whether the authentication carried out by the given authentication body can be considered as authentic with consideration of the legitimacy of time of the previous authentication and of the person carrying out the authentication. It is the core system 100 that notifies the client through the satellite system 200 about the result, and the code ADSN1 will only be issued and registered in the system once authenticity has been verified.

One of the many possible ways of utilising the Loca Credibilia system is the situation where a contract has to be signed by a plurality of persons located in different geographic locations, who are only able to sign at different dates. If there are n different signatories then n+1 codes ADNS1 have to be assigned to the document D and each one of the signatories will sign the document D with their respective own unique codes ADNS1 assigned to them and enter it in the system, and after all signatures have been made, then the system will issue the (n+1)th code ADNS1 to all of the signatories, which certifies that all signatures have been made.

A further possibility of the Loca Credibilia system allows it to prepare a log of all authentication requests and, depending on the client's wishes, the data of the log is issued or partially issued and can also indicate the serial number of the authentication of that particular copy.

Depending on the client's further needs and wishes the system can be broadened and complemented in a flexible way to comply with these new requirements.

It should be noted that the structure shown in the drawings and illustrated in the flowcharts is not the only or the simplest of solutions. It is easy to understand that the code ADNS2 can be generated from the code ADNS1 by a transformation, and the only task of the code ADNS2 is to indicate the storage cell (i. e. to provide its address) in which the transformed control value TCV generated from the document D is stored as content. In the example this storage took place in the attestation database 105.

The operation of the Loca Credibilia system will not be changed even if in the core system 100 the attestation database 105, that stores the transformed control value TCV, will be addressed directly by the code ADNS1, whereby the generation of the second code ADNS2 and the associated work can be spared. Such an economy of effort does not affect the basic concept of the present invention, since even in this case the core system 100 will not contain the useful data of the document D but only the transformed control value TCV generated therefrom. In such a simplified system, however, the aforementioned advantages contributing in the first place to the increased reliability of the core system 100 will not appear.

The invention claimed is:

1. Method for the authentic determination of the identity of a given document presented in electronic form by comparing the document in question with itself at a later date or with a copy made of the document in response to a request raised by a petitioner, comprising:
  forwarding the document in original form to a satellite station of a satellite system for recording the status of the document which station is in connection with the petitioner;
  initiating a request from said satellite station towards a core system that is separated from the satellite system for accepting the document;
  generating in the core system an individual and unique first code independent from any property of the document in response to the request;
  returning the first code to the satellite station which has initiated the request; and there
  associating at the satellite station the first code in a unique and inseparable way to the document; and thereafter:
  generating a transformed control value at the satellite station from the joint presence of the document and the first code preferably by using a hash function;
  forwarding the transformed control value from the satellite stations to the core system and storing there the transformed control value in an attestation database at an address which is identical to the first code or which has been derived from the first code; and
for the purpose of establishing the identity between the original document and a document to be authenticated that also contains a questionable first code, wherein the document to be authenticated is allegedly identical with the document;
  the document to be authenticated is presented at a satellite station of the satellite system, and there generating a questionable transformed control value of the document to be authenticated in the same way as the transformed control value was generated; then
  forwarding the questionable first code on the document to be authenticated and the questionable transformed control value generated during the previous step at the satellite station to the core system, and there, reading from the attestation database the transformed control value that is stored at an address derived from the first code, and comparing the questionable transformed control value sent to the core system with the transformed control value read from the attestation database; and
  in case of authentication the authenticity of the document to be authenticated is confirmed to the satellite station which has requested the authentication, and in the opposite case the authenticity is rejected.

2. The method as claimed in claim 1, wherein the generation of the first code as a first step a numeric sequence is generated by a generator that is one of a very high number of numerous sequences, the number of which is preferably more than $10^{40}$, wherein for these numeric sequences it is true that consecutively generated sequences cannot be determined on the basis of the knowledge and analysis of the previously issued sequences, then, by using a hash function, transforming the generated numeric sequence into a unique numeric sequence that has a predetermined constant length being at least as long as 20 bytes.

3. The method as claimed in claim 2, wherein that the first code is transformed by means of a hash function and a second code is generated therefrom, and the transformed control value is stored at the address of the attestation database that corresponds to the second code.

4. The method as claimed in claim 3, wherein when checking whether there is any content that corresponds to the first code in the core system it is checked whether there is any content in the attestation database at the address corresponding to the second code.

5. The method as claimed in claim 3, wherein the second code is stored in the core system and the first code is stored only until the generation and/or storage of the second code.

6. The method as claimed in claim 1, wherein the document has previously been provided with an authentication certificate issued by a certifying entity included in one or more revocation list accessible by the core system and the document contains an authentication field, the data of the authentication field are forwarded to the core system prior to the delivery of the first code from the core system to the satellite station, and the data of the certifying entity that had generated the authentication field and the revocation lists of the entity are checked by the core system (100), and it is then decided whether the authentication data contained in the authentication field truly belong to that certifying entity and the first code is issued once authenticity has been verified.

7. The method as claimed in claim 1, wherein when the first code is requested then multiple first codes are requested wherein the number of the codes correspond to the number of the elements of a predetermined group, and the possibility to associate these codes within a given timeframe to documents with slight to moderate differences at the same or at different satellite stations is provided, and after the storage of each element of the group into the core system has been carried out, then the group itself will be identified with a further common first code.

8. The method as claimed in claim 7, wherein within the group the documents have identical content and the slight difference is due to the different signatures made at different times and places.

9. The method as claimed in claim 1, wherein a visually visible form, is made of a document available in electronic form on which the associated first code is recorded in a machine readable form, and during the authentication an electronic version is made of the visually visible document and the comparison is based on the identity between the electronically available versions of the original document and its questionable copy.

10. An authentication system for determining the authenticity of a given document by comparing an original document with itself presented at a later date or with a copy made from the document, said determination is carried out in response to a request raised by a petitioner, comprising:
  a satellite system with at least one satellite station and a separate core system, wherein a communication connection is established between the satellite station and the core systems, the respective satellite stations each comprise a central processor, a coder, a memory, an interface for providing a connection with the core system, and when the original document is entered in the satellite station the satellite station requests a first code from the core system and after the receipt thereof the first code is inseparably associated with the original document, and the coder generates a transformed control value from the document after the first code has been associated therewith, or at a later authentication task for determination that a questionable document is identical to the original document the coder generates a questionable transformed control value from the questionable document which is presented for authentication with which a questionable first code has been associated, and the questionable transformed control value is forwarded to the core system;
  a core coder unit that generates the first code in response to the request received from the satellite station in such a way that the first code becomes a unique numeric sequence with a length of at least 20 bytes; and an attestation database in which the transformed control value generated from the original document in the satellite station and associated therewith will be written and stored at an address constituted by the first code or derived from the first code; and the core system comprises furthermore a digital comparator which when carrying out the authentication task compares the questionable transformed control value obtained from the satellite station and generated from the questionable document to be authenticated with the transformed control value stored in the attestation database at an address defined by the later generated questionable first code or derived from this questionable first code in the same way as previously but associated now with the questionable document to be authenticated, and the central processor forwards an authentication signal to the satellite station concerned if the comparison finds identity between the two transformed control values and the questionable transformed control value.

11. The authentication system as claimed in claim 10, wherein the core coder unit generating the first code in the core system comprises a generator which in response to the request arriving from the satellite station generates one of a large number of possible different numeric sequences wherein the number is preferably higher than $10^{40}$, and a coder which generates from this single numeric sequence a unique code which is associated with the sequence and has a constant length and which constitutes said first code.

12. The authentication system as claimed in claim 10, wherein the core system comprises a further coder that transforms the first code and generates thereby a second code, and the address of the attestation database defined by the first code is constituted by this second code.

* * * * *